United States Patent [19]

Treves et al.

[11] Patent Number: 5,595,768
[45] Date of Patent: Jan. 21, 1997

[54] LASER DISK TEXTURING APPARATUS

[75] Inventors: David Treves, Palo Alto; Hong Fu; Thomas O'Dell, both of Milpitas, all of Calif.

[73] Assignee: Komag, Incorporated, Milpitas, Calif.

[21] Appl. No.: 552,185

[22] Filed: Nov. 2, 1995

[51] Int. Cl.$^6$ ..................................................... G11B 5/84
[52] U.S. Cl. .................. 425/174.4; 425/385; 425/810; 264/400; 264/482
[58] Field of Search ................................. 425/174.4, 174, 425/385, 810, 402; 264/400, 427, 430, 482; 219/121.67, 121.73

[56] References Cited

U.S. PATENT DOCUMENTS

| | | | |
|---|---|---|---|
| 4,430,401 | 2/1984 | Wilkinson | 264/400 |
| 4,626,941 | 12/1986 | Sawada et al. | 360/97 |
| 4,710,330 | 12/1987 | Lewandowski et al. | 425/174.4 |
| 5,062,021 | 10/1991 | Ranjan et al. | 360/135 |
| 5,106,288 | 4/1992 | Hughes | 264/482 |
| 5,108,781 | 4/1992 | Ranjan et al. | 427/53.1 |
| 5,164,324 | 11/1992 | Russell et al. | 437/19 |
| 5,322,988 | 6/1994 | Russell et al. | 219/121.69 |
| 5,359,173 | 10/1994 | Opdyke | 264/482 |

FOREIGN PATENT DOCUMENTS

| | | | |
|---|---|---|---|
| 0652554 | 5/1995 | European Pat. Off. | G11B 5/84 |
| 8106630 | 4/1996 | Japan . | |

OTHER PUBLICATIONS

Baumgart, P. et al., "Safe Landings: Laser Texturing of High-Density Magnetic Disks", Data Storage, pp. 21–27 (Mar. 1996).

Kuo et al., "A New Texture Paradigm—Laser Zone Texture For Low Glide and Low Stiction Media", IDEMA Insight on Pseudo–Contact Recording II, vol. IX, No. 4, pp. 8–11 (Jul./Aug. 1996).

Kozu et al., "Tribological Behaviour of Rigid Disks with High Density Micro Cone-Shaped Projections", 1996 Digest of Intermag '96, p. HA-05 (1996).

Cohen, M. I., "Material Processing", Laser Handbook, ch. F4, p. 1635 (North-Holland Publishing Co., 1972).

Isenor, N. R., "$CO_2$ Laser–Produced Ripple Patterns on $Ni_xP_{1-x}$ Surfaces", Appl. Phys. Let., vol. 31, No. 3, p. 148 et seq. (1 Aug. 1977).

(List continued on next page.)

Primary Examiner—Khanh P. Nguyen
Attorney, Agent, or Firm—Jonathan A. Small

[57] ABSTRACT

Reflection of a generated radiation beam (e.g., laser) from a disk substrate during radiation-induced texturing such that the reflection interferes with the generated radiation beam is eliminated as follows: the beam path of the laser beam is passed through focusing optics to focus the beam to a spot on the substrate surface; the beam path is offset from the center of the focusing optics so that the focusing optics bend the beam path, and further so that the beam is angled from normal to the surface of the disk, for example by between 2 and 5 degrees; and that portion of the beam reflected by the disk surface is blocked by appropriate means prior to its impinging upon the source of the generated radiation beam.

4 Claims, 4 Drawing Sheets

OTHER PUBLICATIONS

Guosheng, Z. et al., "Growth of Spontaneous Periodic Surface Structures on Solids During Laser Illumination", Phy. Rev. B, vol. 26, No. 10, pp. 5366 et seq. (15 Nov. 1982).

Young, J. F. et al., "Laser–Induced Periodic Surface Structure. II Experiments on Ge, Si, Al, and Brass", Phys. Rev. B, vol. 27, No. 2, pp. 1155 et seq. (15 Jan. 1983).

Herzinger, G et al., "Fundamentals of Laser Micromachining of Metals", Laser Processing and Diagnostics, Proceedings on an International Conference, University of Linz, Austria, Springer–Verlag publisher, p. 90 et seq. (1984).

Korotchenko, A. I. et al., "Formation of Annular Relief on the Surface of a Metal After Exposure to a Strong Energy Pulse", Sov. Phys./Tech. Phys., vol. 32, No. 1, p. 99 et seq. (1987).

Lu, K. et al., "Comparison of Properties of Nanocrystalline and Amorphous Ni–P Alloys", J. Appl. Phys. D, vol. 25, No. 5, p. 808 et seq. (1992).

Kumar, P. S. et al., "Effect of Phosphorous Content on the Relative Proportions of Crystalline and Amorphous Phases in Electroless NiP Deposits", J. Matl. Sci. Let. vol. 13, No. 9, p. 671 et seq. (1994).

Waseda, Y. et al., "The Structure of Molten Nickel–Phosphorus Alloys", Z. Naturforsch., vol. 32a, No. 12, p. 1506 et seq. (Dec. 1977).

Baumgart, P. et al., "A New Laser Texturing Technique for High Performance Magnetic Disc Drives", IEEE Trans. Mag., vol. 31, No. 6, p. 2946 et seq.(Nov. 1995).

LASER DISK TEXTURING APPARATUS

The present invention relates to the field of magnetic disk manufacturing, and more particularly to an apparatus for creating a desired surface texture on selected regions of a magnetic recording disk.

Methods and apparatus for creating texture features on the surface of magnetic recording disks using laser energy are known. See, for example, U.S. Pat. Nos. 5,062,021 and 5,108,781 to Ranjan et al., and published European Patent Application number 94308034.1.

As is known from these references, the output beam of a pulsed laser is focused onto the surface of one layer of a magnetic disk with sufficient intensity to locally melt a portion of that layer and/or sublayers. When the laser power is sufficiently attenuated, the melted region resolidifies, leaving a geometric variation (referred to herein as a laser texture feature) in the surface topography of the targeted layer or sublayers. The physical characteristics of the laser texture features are a function of laser pulse width, spot size and shape, and spot energy.

Most commonly, these laser texture features are either craters or bumps ("sombreros") formed in a planar, specular nickel phosphorous (NIP) layer on an aluminum substrate (in the case of the aforementioned published European Patent Application, such features are formed directly on the surface of a glass substrate). The rims of the craters or tops of the bumps rise above the plane of the surface of the layer in which they are formed. Subsequent layers deposited on the layer having the laser texture features carry forward the laser texture features so that the finished multi-layered magnetic disk has approximately those same laser texture features (e.g., shape, depth/height, density, etc.) in its outermost layer.

A magnetic disk having variation in its surface topography formed by laser melting and resolidification is referred to herein as a laser textured disk. As well known, a magnetic disk having a smooth, specular surface is preferred in the art to permit a transducer to ride as close to the disk surface as possible. Therefore, particular attention has been paid to processes for forming laser texture features in a special landing or CSS zone of the disk, for example as taught by Sugiyama in published Japanese patent application number 4-139621.

One important criterion for laser textured disks is that the fluctuation in height of the laser texture features be very small (i.e., that the features be as close to the same height from the magnetic disk surface as possible). If the heights of certain features are greater than others, those taller features will essentially appear as asperities with which a transducer will collide during operation, resulting in degradation of performance.

In typical laser texturing apparatus known in the art, the laser beam creating the laser texture features impinges the disk surface normal to that surface. As will be further detailed below, we have discovered that this leads to a reflection of coherent laser light from the disk surface back into the laser's cavity, which causes: (a) the laser's output energy to fluctuate (affecting the uniformity of attributes of the laser texture feature such as height and shape); (b) instability of the laser's mode (distorting the focus of the laser spot on the disk surface); and (c) instability in the optical focal length (affecting the power of the spot on the disk surface). In addition, this reflection can alter, in an uncontrolled manner, the average parameters of the beam. The net result is nonuniformity of the height and shape of the laser texture features produced by such an apparatus.

It is an object of the present invention to improve the laser texture feature uniformity and reproducibility by eliminating the reflection of coherent laser light from the disk surface back into the laser cavity.

SUMMARY OF THE INVENTION

The present invention is an apparatus for creating laser texture features in a magnetic recording disk designed to overcome the problems of reflection and feedback of the feature-forming coherent laser light into the laser cavity. Eliminating the feedback of coherent laser light results in elimination of feedback-induced power variation of the laser. Elimination of this power variation results in an increase in an improvement in uniformity of the height and shape of such features.

According to the present invention, elimination of the feedback of laser light into the laser cavity is accomplished as follows:

- the beam path of the laser beam is passed through focusing optics to focus the beam to a spot on the disk surface;
- the beam path is radially offset from the radial center of the focusing optics so that the focusing optics bend the beam path, and further so that the beam is angled from normal to the surface of the disk, for example by between 2 and 5 degrees; and
- that portion of the beam reflected by the disk surface is blocked by appropriate means prior to its entering the laser cavity.

The magnetic disk typically comprises an aluminum substrate onto which numerous layers are formed. A first such layer is comprised of nickel phosphate plated onto the substrate. According to one embodiment of the present invention, the laser energy is focused on the surface of the plated nickel phosphate layer, and the laser texture features are formed in the plated nickel phosphate layer. According to another embodiment, the laser energy is focused on the surface of the aluminum substrate itself, and the laser texture features are formed in the aluminum substrate.

Subsequent to forming the laser texture features, additional layers are formed on the substrate, such as layers of magnetic material and layers of hard and corrosion resistant protective material. These subsequent layers deposited on the layer having the laser texture features carry forward the laser texture features so that the finished multilayered magnetic disk has approximately those same laser texture features (e.g., shape, depth/height, density, etc.) in its outermost layer.

BRIEF DESCRIPTION OF THE DRAWINGS

The present invention will be described in greater detail below, including specific examples thereof, with regard to the figures, in which.

As between each of these figures, like reference numerals shall denote like elements.

DETAILED DESCRIPTION

For purposes of illustration, the present invention will be described by way of selected embodiments. It will be apparent to one skilled in the art that the embodiments, and the environment in which they are developed, demonstrate the functionality and features of the present invention. It will also be apparent that certain variations, additions, deletions, modifications, etc., to the embodiments, although not specifically discussed herein, are contemplated and within the scope of one skilled in the art given the present disclosure. Therefore, recitation of embodiments is not intended as, nor should be read as, limiting the scope of the invention claimed herein.

Figure 1:
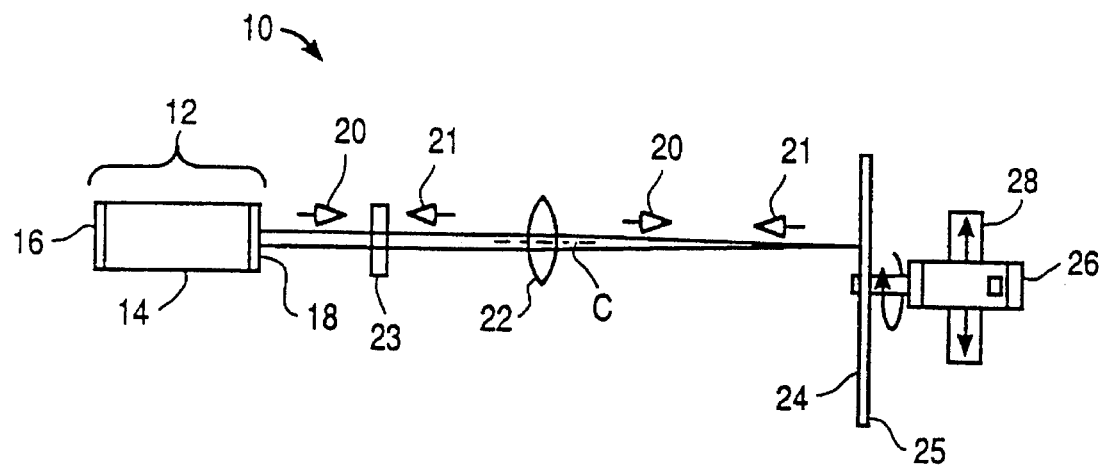
FIG. 1 is a schematic illustration of an apparatus for producing laser texture features in magnetic hard disk substrate of the type known in the art.

FIG. 1 is a schematic illustration of an apparatus 10 for creating laser texture features in a layer of a magnetic recording disk. Apparatus 10 consists of a pulsed laser 12, for example a Q-switched (pulsed) YAG laser, which, as well known, consists of a laser cavity 14 bounded by distal mirror 16 and half-silvered proximal mirror 18. Laser 12 produces a coherent laser beam 20, which is directed toward focusing optics (lens or a combination of lenses) 22. Optionally, the laser beam may be attenuated as well known in the art, for example by a neutral density filter 23.

Laser beam 20 is focused by focusing optics 22 to a spot on a surface (referred to as the target surface 24) of a selected layer of magnetic disk 25 retained in a disk receiving region 29. Target surface 24 may be the surface of the substrate of magnetic disk 25 or may be one of several layers formed on the substrate, such as a plated NiP layer. Beam 20 is incident on target surface 24 approximately perpendicular, or normal, to the plane of said surface (e.g., within a few degrees of 90 degrees). Motor 26 causes magnetic disk 25 to rotate, so that as the laser 12 is pulsed, each pulse of beam 20 may be made incident on a different circumferential region of target surface 24. In addition to rotation, magnetic disk 25 is translated roughly perpendicular to the path of beam 20, for example by a motor 28, so that the radial location of incidence of laser beam 20 on target surface 24 may be varied.

Figure 2A:
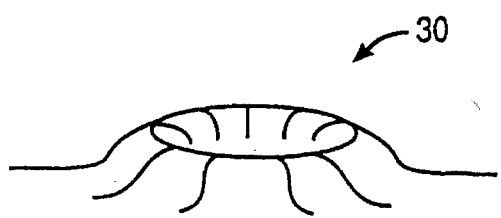
FIGS. 2A and 2B are perspective and cross-sectional views, respectively, of a crater-type laser texture feature.
Figure 2B:
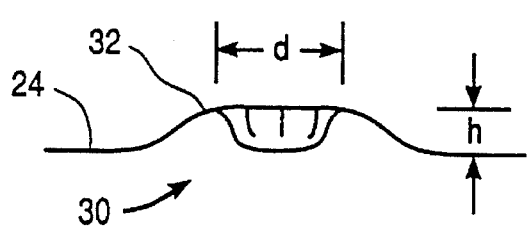

The incidence of laser beam 20 on target surface 24 generally forms one of two types of laser texture features, as determined by the parameters of the laser and material comprising the target surface 24. A first of these representative features is referred to as a "crater", and is shown in FIG. 2A in perspective and FIG. 2B in cross-section. Crater 30 has a raised rim 32, which rises above the plane of target surface 24. The height of the crater-type laser texture feature is the height h of the rim 32 above the plane of target surface 24. The width of the crater-type laser texture feature 30 is the diameter d of the roughly circular rim 32.

Figure 3A:
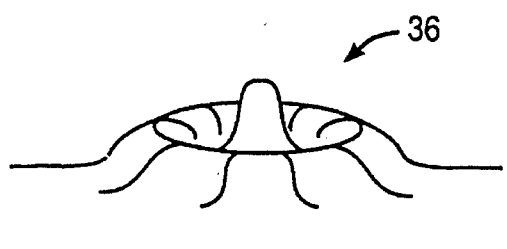
FIGS. 3A and 3B are perspective and cross-sectional views, respectively, of a sombrero-type laser texture feature.
Figure 3B:
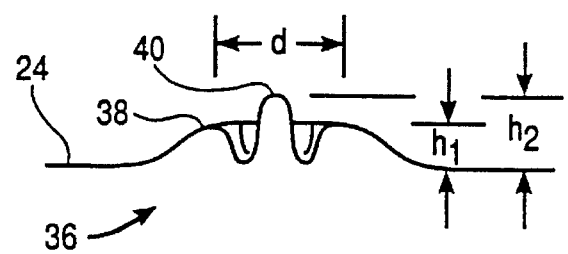

The second representative feature is referred to as a "sombrero" (so-called since in cross section it resembles this type of hat), and is shown in FIG. 3A in perspective and FIG. 3B in cross-section. Sombrero 36 has a raised rim 38 as well as a central crown 40, which both generally rise above the plane of target surface 24. The height of the sombrero-type laser texture feature is either the height $h_1$ of the rim 38 or the height $h_2$ of the crown 40, whichever is greater, above the plane of target surface 24. The width of the sombrero-type laser texture feature 36 is the diameter d of the roughly circular rim 38.

The prior art arrangement described and shown in FIG. 1 leads to the disadvantage described above—namely, since the angle of reflection will equal the angle of incidence, beam 21, which is a portion of beam 20, is reflected by the target surface 24 directly back along the beam's path through the focusing optics 22 (including attenuator 23) and proximal mirror 18 into laser cavity 14. The reflected coherent laser light interferes with the lasing and Q-switching processes of laser 12, and subsequent laser pulses have peak and mean power fluctuations, variations in laser mode, and the system's optical focal length varies. The net result is nonuniformity in the shape and height of the laser texture features.

Figure 4A:
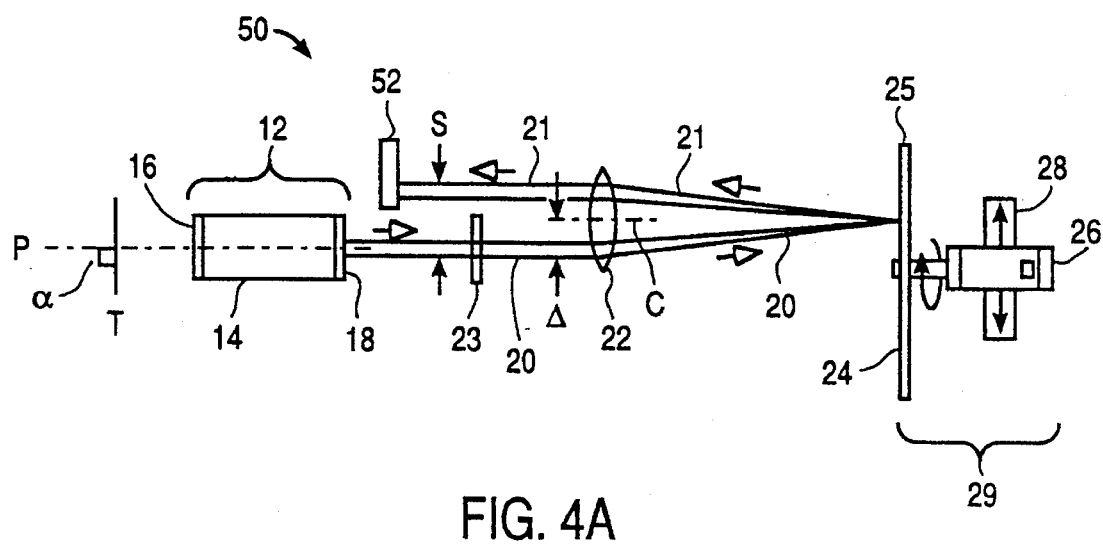
FIGS. 4A through 4D are schematic illustrations of four embodiments of an apparatus for producing laser texture features in a magnetic hard disk substrate, each designed to eliminate feedback of laser light into the cavity of the laser.

FIG. 4A details one embodiment 50 of the present invention which is designed to eliminate feedback of laser light into laser cavity 14. The components of this embodiment are essentially the same as that of the prior art apparatus described and shown in FIG. 1. However, in this embodiment, the path of laser beam 20 is offset relative to the center line C of the focusing lens by a distance Δ, for example 1.5 mm. This offset results in the laser beam 20 striking the target surface 24 at a slight angle, such as approximately between 2 and 5 degrees.

As in the prior art apparatus described above, some of laser beam 20 is reflected by the target surface 24. Since the angle of reflection equals the angle of incidence, the reflected beam 21 is not along the path of beam 20, but diverges at an angle away from beam 20. Focusing optics 22 bends the path of beam 21 so that it is parallel to but spaced apart from the path of beam 20 by a distance S, equal to twice the value of Δ, for example 3 mm.

According to the embodiment 50 shown in FIG. 4A, a blocking apparatus or plate 52 is positioned in the path of beam 21 which serves simply to block and absorb any part of the reflected beam, preventing the reflected beam from entering the laser cavity or otherwise affecting the system. According to this embodiment, blocking apparatus 52 is simply a metal plate located on the same side of the focusing optics 22 as laser 12. According to a variation on this embodiment, blocking apparatus 52 is a metal plate located on the same side of the focusing optics 22 as magnetic disk 25, as shown in FIG. 4C.

Figure 4B:
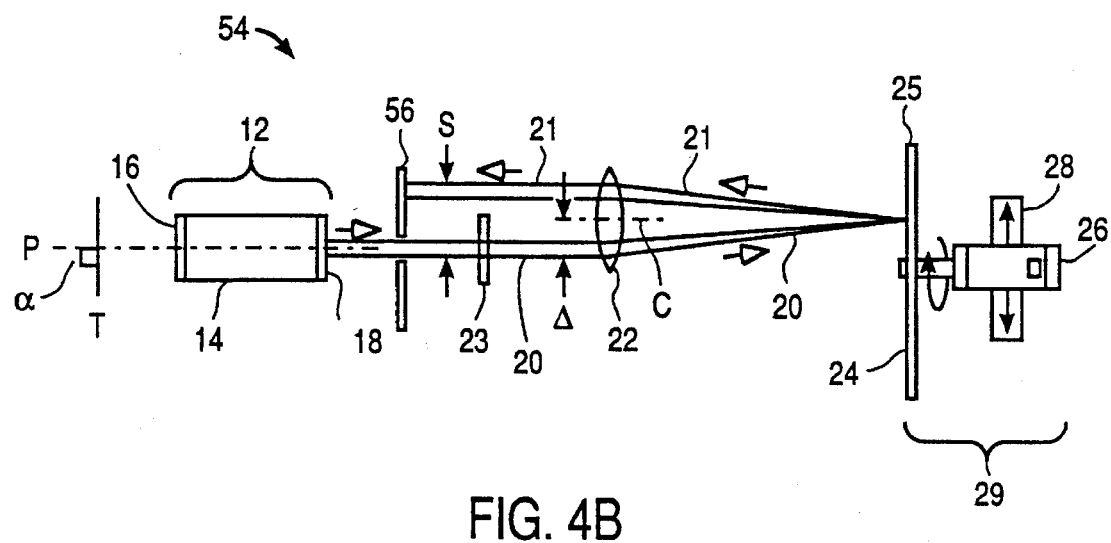
Figure 4C:
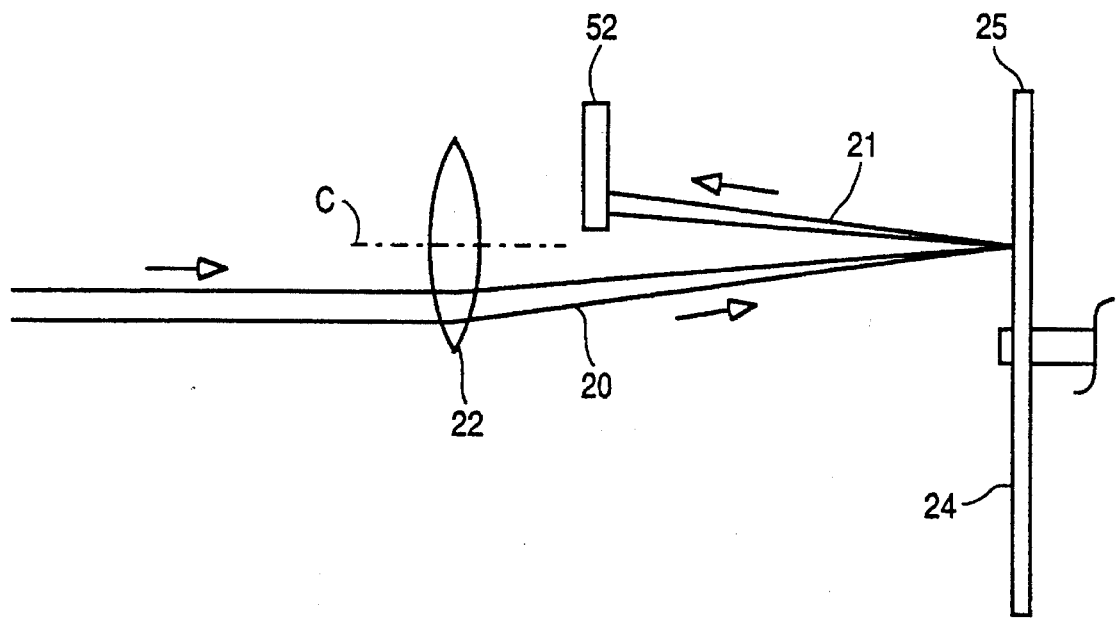
Figure 4D:
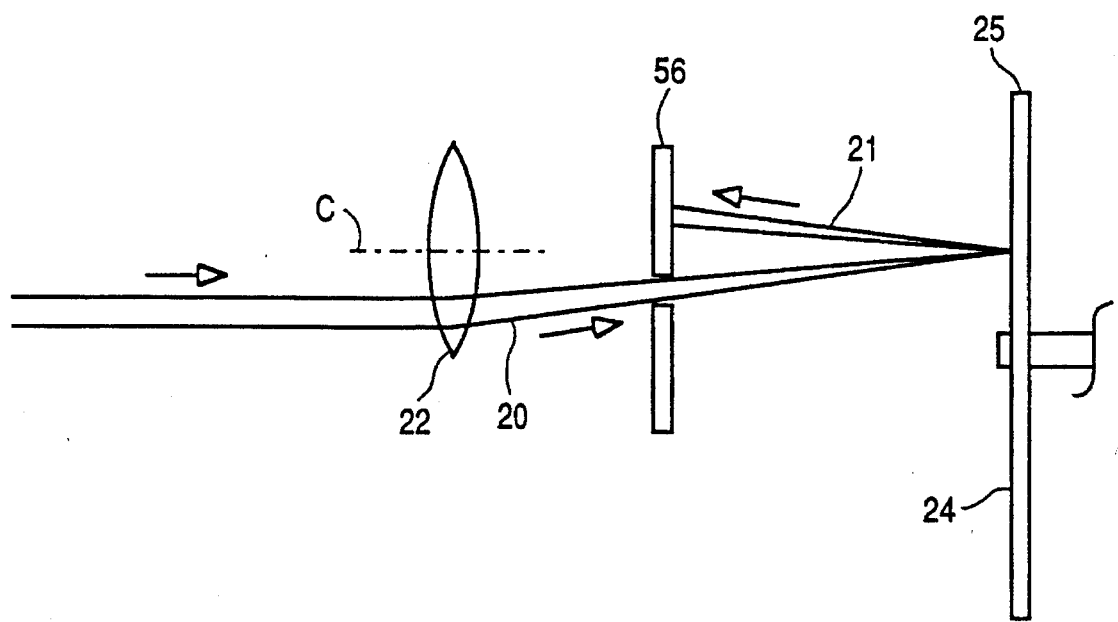

Alternatively, according to the embodiment 54 shown in FIG. 4B, beam 20 passes through the aperture in an iris plate 56 which is located on the same side of the focusing optics 22 as laser 12. The radius of the aperture is large enough to let beam 20 pass therethrough unaffected, but small enough to block beam 21 on its return toward the laser 12. According to a variation on this embodiment, iris plate 56 is located on the same side of the focusing optics 22 as magnetic disk 25, as shown in FIG. 4D.

In each of these embodiments, the axis of the path P of beam 20 was at an angle α of approximately 90 degrees relative to the plane T of target surface 24. This angle may be varied however, according to the requirements of particular applications of the present invention.

We have performed a number of experiments to verify the advantages of the present invention. In these experiments, a Q-switched YLF laser, model 7960-L4-E (2000 mW, Nd:YLF), manufactured by Spectra-Physics Lasers, Inc. of Mountain View, Calif. was operated at a pulse energy of 6.8 μJoules. (Other laser sources, such as YAG lasers are equally useful.) The 2 mm laser beam was passed through a neutral density filter (attenuator) and a 7 mm focusing lens of focal length 30 mm. The laser was pulsed at 10 Khz.

In a first experiment, the laser beam was roughly centered on the focusing lens, and roughly normally incident on the planar surface of a NiP layer plated on an aluminum substrate. Many nominally identical laser texture features were formed, and a statistical measure of those features was made (approximately 100 randomly chosen laser texture features were measured).

In a second experiment, the laser beam was offset from the center of the focusing lens by 1.5 mm. It was passed through an iris, and made incident on the NiP layer's planar surface at an angle of approximately between 2 and 5 degrees. The laser light was reflected from the substrate surface at approximately the angle of incidence and passed through the focusing lens, which brought the reflected beam's path roughly parallel to the beam path exiting laser, but offset approximately 3 mm. The opening in the iris was set so that it blocked the reflected beam's at this point. Again, many laser texture features were formed, and a statistical measure of those features was made (approximately 100 randomly chosen laser texture features were measured).

Table 1 summarizes the results of the statistical measures of these two experiments. In both experiments, laser texture features of the sombrero type were formed.

TABLE 1

| Experiment Number | Offset | | Mean | Min | Max | Sigma | Sigma/Mean |
|---|---|---|---|---|---|---|---|
| 1 | 0 (centered) | Height (nm) | 22.9 | 17.2 | 27.3 | 1.8 | 0.08 |
| | | Width (μm) | 20.3 | 19.5 | 21.4 | 0.4 | 0.02 |
| 2 | 1.5 mm | Height (nm) | 23.3 | 21.7 | 26.8 | 0.9 | 0.04 |
| | | Width (μm) | 19.6 | 19.0 | 20.3 | 0.3 | 0.02 |

As can be seen from Table 1, when the laser was centered on the focusing lens in experiment 1, the laser texture features varied in height between 17.2 nm and 27.3 nm, with a standard deviation of 1.8 nm. Changing only the offset of the laser relative to the focusing lens, and blocking the reflected laser beam, the variation in laser texture feature height in experiment 2 narrowed to between 21.7 nm and 26.8 nm, with a standard deviation of 0.9 nm. Comparing the standard deviation divided by the mean for these two experiments gives the relative effect of the reduced standard deviation, a fifty percent relative improvement in feature height uniformity.

Figure 5A:
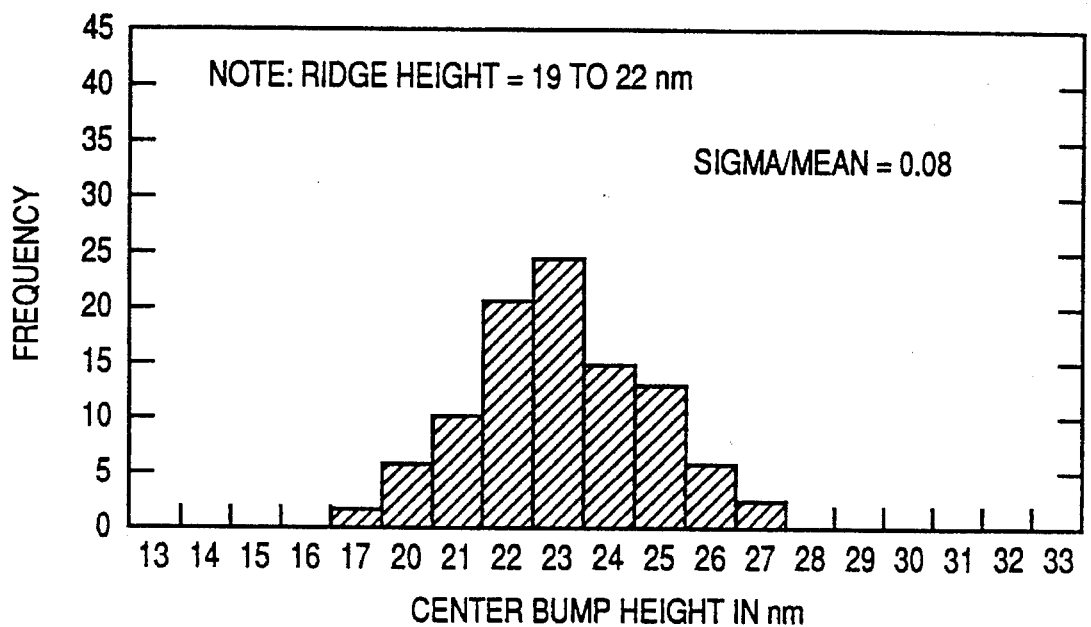
FIGS. 5A and 5B are histograms from an experiment comparing the laser texture feature heights on disks manufactured by apparatus of the prior art and the present invention, respectively.
Figure 5B:
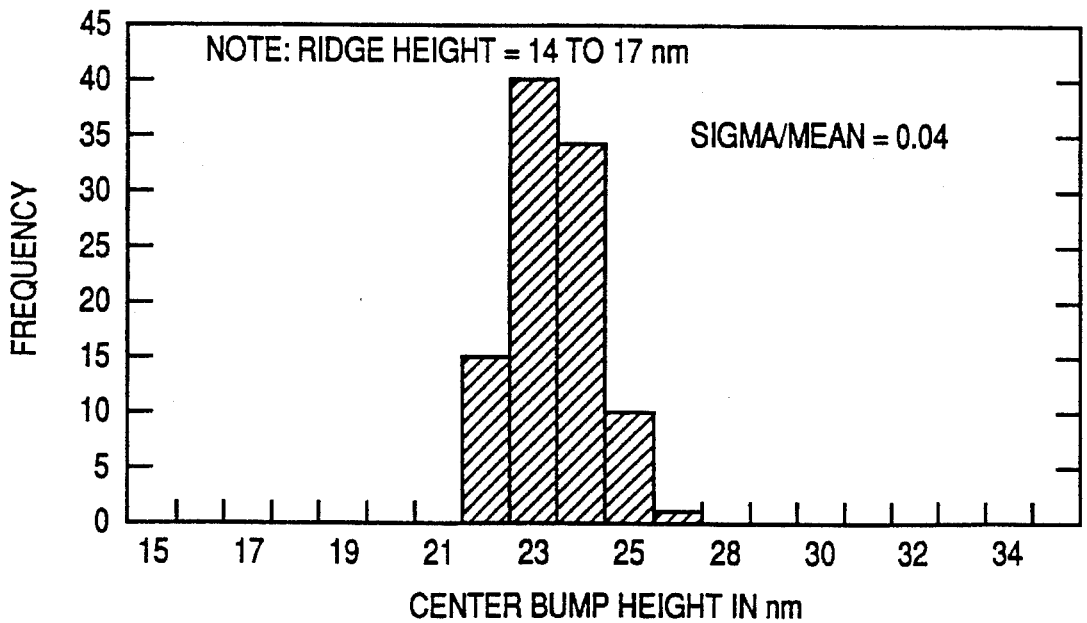

FIGS. 5A and 5B illustrates the results of additional runs of the these experiments. FIG. 5A is a plot of the number of laser texture features (frequency) plotted against feature height (Center Bump Height) for features fabricated by a prior art apparatus of the type described and shown in FIG. 1. FIG. 5B is a similar plot for features fabricated by an apparatus according to the present invention of the type shown in FIG. 4. As can be graphically seen, the distribution of heights is much narrower for the features fabricated by the apparatus according to the present invention. The narrower distribution of feature height (more uniform feature height) will result in fewer collisions between the transducer and laser texture features, reducing the generation of wearcausing debris, damage to the transducer, etc.

In general, to those skilled in the art to which this invention relates, many changes in construction and widely differing embodiments and applications of the present invention will suggest themselves without departing from its spirit and scope. For example, the present invention has been described from the perspective of forming laser texture features in metal layers. However, there are numerous disclosures in the art relating to the formation of laser texture features in nonmetallic materials, such as glass, which would benefit from the teachings of the present invention.

Furthermore, the present invention has been described in terms of two common cross sections of laser texture feature the crater and the sombrero. However, these shapes are merely illustrative, and the present invention is not limited to formation of laser texture features of any particular cross-section. In addition, a laser has exemplified the radiation source used to form the texture features. However, other sources of radiation may be employed to form texture features, and where such sources pose the problem of interference or attenuation upon reflection, the present invention may be employed. Principal other sources include radiation outside the visible spectrum, such as infrared radiation. Thus, the disclosures and descriptions herein are illustrative, and are not intended and should not be read to be in any sense limiting.

What is claimed is:

1. An apparatus for forming a texture feature on a generally planar disk substrate of a magnetic disk recording, such feature formed by the incidence of a beam of radiation upon the substrate, comprising:

a focusing lens having a radially central axis;

a disk substrate receiving apparatus disposed on a first side of the focusing lens, for receiving and retaining a generally planar disk substrate such that the plane of the disk substrate is approximately perpendicular to the central axis of the focusing lens;

a radiation beam source for generating a radiation beam directed at said focusing lens, disposed on a second side of the focusing lens opposite the first side, and positioned such that, prior to incidence upon the focusing lens, a radiation beam generated thereby is in a beam axis approximately parallel to, but radially offset from the central axis of the focusing lens, the radiation beam being focusable by the focusing lens to a spot upon a disk substrate retained by the disk substrate receiving apparatus; and a blocking apparatus disposed such that a reflected beam, comprising any part of the radiation beam reflected by a disk substrate retained by the disk substrate receiving apparatus, is blocked from entering the radiation beam source thereby.

2. The apparatus of claims 1, wherein said blocking apparatus is an iris plate having a central aperture encircling a central radial axis, disposed such that the radiation beam passes through the aperture, the aperture being sized such that the radiation beam passes therethrough, but the reflected beam is incident upon the surface of the iris, the iris thereby blocking and absorbing the reflected beam and preventing it from entering the radiation source.

3. An apparatus for forming a texture feature on a generally planar disk substrate of a magnetic disk recording, such feature formed by the incidence of a beam of radiation upon the substrate, comprising:

a focusing lens having a radially central axis;

a disk substrate receiving apparatus disposed on a first side of the focusing lens, for receiving and retaining a generally planar disk substrate such that the plane of the disk substrate is approximately perpendicular to the central axis of the focusing lens;

a radiation beam source for generating a radiation beam directed at said focusing lens, disposed on a second side of the focusing lens opposite the first side, and positioned such that, prior to incidence upon the focusing lens, a radiation beam generated thereby is in a beam axis approximately parallel to, but radially offset from the central axis of the focusing lens, the radiation beam being focusable by the focusing lens to a spot upon a disk substrate retained by the disk substrate receiving apparatus; and a blocking apparatus disposed on said second side of the focusing lens such that a reflected beam, comprising any part of the radiation beam reflected by a disk substrate retained by the disk substrate receiving apparatus, which is focused by the focusing lens into a reflected beam axis which is parallel to but offset from the beam axis is blocked from entering the radiation beam source thereby.

4. The apparatus of claims 3, wherein said blocking apparatus is an iris plate having a central aperture encircling a central radial axis, disposed such that said central radial axis is coaxial with the beam axis so that the radiation beam may pass through the aperture prior to being incident upon the focusing lens, the aperture being sized such that the radiation beam passes therethrough, but that part of the reflected beam having an axis parallel to but radially offset from the central radial axis is incident upon the surface of the iris, the iris thereby blocking and absorbing the reflected beam and preventing it from entering the radiation source.

* * * * *